US007739588B2

(12) United States Patent
Reynar et al.

(10) Patent No.: US 7,739,588 B2
(45) Date of Patent: Jun. 15, 2010

(54) LEVERAGING MARKUP LANGUAGE DATA FOR SEMANTICALLY LABELING TEXT STRINGS AND DATA AND FOR PROVIDING ACTIONS BASED ON SEMANTICALLY LABELED TEXT STRINGS AND DATA

(75) Inventors: Jeff Reynar, Woodinville, WA (US); Brian Jones, Redmond, WA (US); Ziyi Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 10/608,267

(22) Filed: Jun. 27, 2003

(65) Prior Publication Data

US 2004/0268237 A1    Dec. 30, 2004

(51) Int. Cl.
    *G06F 15/00*    (2006.01)
(52) U.S. Cl. .................. 715/234; 715/708; 715/760
(58) Field of Classification Search ............... 715/513, 715/515–516, 707–708, 234, 209–210, 760
    See application file for complete search history.

(56) References Cited

U.S. PATENT DOCUMENTS

| | | | |
|---|---|---|---|
| 4,674,065 A | 6/1987 | Lange et al. ............... 382/311 |
| 4,868,750 A | 9/1989 | Kucera et al. .............. 711/2 |
| 5,020,019 A | 5/1991 | Ogawa ..................... 707/5 |
| 5,128,865 A | 7/1992 | Sadler ..................... 704/2 |
| 5,159,552 A | 10/1992 | van Gasteren et al. ........ 704/1 |
| 5,267,155 A | 11/1993 | Buchanan et al. ........... 715/540 |
| 5,287,448 A | 2/1994 | Nicol et al. ............... 715/707 |
| 5,297,039 A | 3/1994 | Kanaegami et al. .......... 707/5 |
| 5,317,546 A | 5/1994 | Balch et al. ............... 368/9 |
| 5,337,233 A | 8/1994 | Hofert et al. .............. 715/540 |
| 5,341,293 A * | 8/1994 | Vertelney et al. ........... 715/530 |
| 5,351,190 A | 9/1994 | Kondo ..................... 704/8 |
| 5,386,564 A | 1/1995 | Shearer et al. ............. 707/101 |
| 5,392,386 A | 2/1995 | Chalas .................... 715/841 |
| 5,418,902 A | 5/1995 | West et al. ................ 715/503 |

(Continued)

FOREIGN PATENT DOCUMENTS

CA    2 249 920 A1    3/2000

(Continued)

OTHER PUBLICATIONS

Menu Customizing, IBM TDB, vol. 34, No. 1, pp. 91-92, Jun. 1991.*

(Continued)

*Primary Examiner*—Cesar B Paula
(74) *Attorney, Agent, or Firm*—Merchant & Gould

(57) ABSTRACT

Markup language data applied to text or data is leveraged for providing helpful actions on certain types of text or data such as names, addresses, etc. Selected portions of text or data entered into a document and any associated markup language data are passed to an action dynamically linked library (DLL) for obtaining actions associated with markup language elements applied to the text or data. The text or data may be passed to a recognizer DLL for recognition of certain data types. The recognizer DLL utilizes markup language data associated with the text or data to assist recognition and labeling of text or data. After all applicable text and/or data is recognized and labeled, an action DLL is called for actions associated with the labeled text or data.

18 Claims, 6 Drawing Sheets

U.S. PATENT DOCUMENTS

| | | | |
|---|---|---|---|
| 5,446,891 A | 8/1995 | Kaplan et al. | 395/600 |
| 5,522,089 A | 5/1996 | Kikinis et al. | 710/73 |
| 5,535,323 A | 7/1996 | Miller et al. | 715/707 |
| 5,541,836 A | 7/1996 | Church et al. | 704/7 |
| 5,546,521 A | 8/1996 | Martinez | 715/711 |
| 5,581,684 A | 12/1996 | Dudzik et al. | 715/708 |
| 5,596,700 A | 1/1997 | Darnell et al. | 715/512 |
| 5,617,565 A | 4/1997 | Augenbraun et al. | 707/4 |
| 5,625,783 A | 4/1997 | Ezekiel et al. | 395/352 |
| 5,627,567 A | 5/1997 | Davidson | 345/173 |
| 5,627,958 A | 5/1997 | Potts et al. | 715/708 |
| 5,634,019 A * | 5/1997 | Koppolu et al. | 715/744 |
| 5,640,560 A | 6/1997 | Smith | 707/104.1 |
| 5,657,259 A | 8/1997 | Davis et al. | 708/204 |
| 5,685,000 A | 11/1997 | Cox | 704/9 |
| 5,708,825 A | 1/1998 | Sotomayor | 715/501.1 |
| 5,715,415 A | 2/1998 | Dazey et al. | 715/708 |
| 5,717,923 A | 2/1998 | Dedrick | 707/102 |
| 5,752,022 A | 5/1998 | Chiu et al. | 707/10 |
| 5,761,589 A | 6/1998 | Rayson et al. | 707/533 |
| 5,764,794 A | 6/1998 | Perlin | 382/186 |
| 5,765,156 A | 6/1998 | Guzak et al. | 707/100 |
| 5,781,189 A * | 7/1998 | Holleran et al. | 715/826 |
| 5,781,904 A | 7/1998 | Oren et al. | 707/100 |
| 5,794,257 A | 8/1998 | Liu et al. | 715/501.1 |
| 5,799,068 A | 8/1998 | Kikinis et al. | 379/93.06 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 709/218 |
| 5,802,530 A | 9/1998 | van Hoff | 715/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A * | 10/1998 | Wolf et al. | 715/752 |
| 5,821,931 A | 10/1998 | Berquist et al. | 715/784 |
| 5,822,539 A | 10/1998 | van Hoff | 709/236 |
| 5,822,720 A | 10/1998 | Bookman et al. | 704/3 |
| 5,826,025 A | 10/1998 | Gramlich | 709/217 |
| 5,832,100 A | 11/1998 | Lawton et al. | 382/100 |
| 5,845,077 A | 12/1998 | Fawcett | 709/221 |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,884,266 A | 3/1999 | Dvorak | 704/270.1 |
| 5,892,919 A | 4/1999 | Nielsen | 395/200.58 |
| 5,893,073 A | 4/1999 | Kasso et al. | 705/8 |
| 5,893,132 A | 4/1999 | Huffman et al. | 715/201 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,139 A | 8/1999 | Feigner et al. | 715/708 |
| 5,933,140 A | 8/1999 | Strahorn et al. | 715/712 |
| 5,933,498 A | 8/1999 | Schneck et al. | 705/54 |
| 5,940,614 A | 8/1999 | Allen et al. | 717/120 |
| 5,944,787 A | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,987,480 A | 11/1999 | Donohue et al. | 715/501.1 |
| 5,991,719 A | 11/1999 | Yazaki et al. | 704/251 |
| 5,995,756 A | 11/1999 | Hermann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,028,605 A | 2/2000 | Conrad et al. | 345/840 |
| 6,029,135 A | 2/2000 | Krasle | 704/275 |
| 6,029,171 A | 2/2000 | Smiga et al. | 707/102 |
| 6,031,525 A | 2/2000 | Perlin | 345/173 I |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,072,475 A | 6/2000 | Van Ketwich | 345/173 |
| 6,073,090 A | 6/2000 | Fortune et al. | 704/8 |
| 6,085,201 A | 7/2000 | Tso | 715/505 |
| 6,088,711 A | 7/2000 | Fein et al. | 715/523 |
| 6,092,074 A | 7/2000 | Rodkin et al. | 707/102 |
| 6,108,640 A | 8/2000 | Slotznick | 705/26 |
| 6,108,674 A | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,469 A | 12/2000 | Safai et al. | 710/62 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | 715/705 |
| 6,219,698 B1 | 4/2001 | Iannucci et al. | 709/221 |
| 6,246,404 B1 | 6/2001 | Feigner et al. | 715/708 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,282,489 B1 | 8/2001 | Bellesfield et al. | 701/201 |
| 6,291,785 B1 | 9/2001 | Koga et al. | 209/584 |
| 6,292,768 B1 | 9/2001 | Chan | 704/1 |
| 6,295,061 B1 * | 9/2001 | Park et al. | 715/764 |
| 6,297,822 B1 | 10/2001 | Feldman | 715/705 |
| 6,300,950 B1 | 10/2001 | Clark et al. | 715/705 |
| 6,308,171 B1 | 10/2001 | De La Huerga | 707/3 |
| 6,311,152 B1 | 10/2001 | Bai et al. | 704/9 |
| 6,311,177 B1 | 10/2001 | Dauerer et al. | 707/2 |
| 6,311,194 B1 | 10/2001 | Sheth et al. | 715/505 |
| 6,320,496 B1 | 11/2001 | Sokoler et al. | 340/470.1 |
| 6,323,853 B1 | 11/2001 | Hedloy | 345/339 |
| 6,336,125 B2 * | 1/2002 | Noda et al. | 715/531 |
| 6,336,131 B1 * | 1/2002 | Wolfe | 709/203 |
| 6,338,059 B1 | 1/2002 | Fields et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,381,742 B2 | 4/2002 | Forbes et al. | 717/176 |
| 6,382,350 B1 | 5/2002 | Jezewski et al. | 181/290 |
| 6,392,668 B1 | 5/2002 | Murray | 715/38 |
| 6,396,515 B1 | 5/2002 | Hetherington et al. | 715/762 |
| 6,401,067 B2 | 6/2002 | Lewis et al. | 704/275 |
| 6,408,323 B1 | 6/2002 | Kobayashi et al. | 718/100 |
| 6,413,100 B1 | 7/2002 | Dickmeyer et al. | 434/322 |
| 6,415,304 B1 | 7/2002 | Horvitz | 715/205 |
| 6,421,678 B2 | 7/2002 | Smiga et al. | 707/102 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,441,753 B1 | 8/2002 | Montgomery | 341/34 |
| 6,442,545 B1 | 8/2002 | Feldman et al. | 707/8 |
| 6,442,591 B1 | 8/2002 | Haynes et al. | 709/206 |

| | | | | | | | |
|---|---|---|---|---|---|---|---|
| 6,456,304 B1 | 9/2002 | Anguilo et al. | 715/779 | 6,975,983 B1 | 12/2005 | Fortescue et al. | 704/9 |
| 6,470,091 B2 | 10/2002 | Koga et al. | 382/101 | 6,976,090 B2 | 12/2005 | Ben-Shaul et al. | 709/246 |
| 6,473,069 B1 | 10/2002 | Gerpheide | 345/157 | 6,976,209 B1 | 12/2005 | Storisteanu et al. | 715/201 |
| 6,477,510 B1 | 11/2002 | Johnson | 705/30 | 6,981,212 B1 | 12/2005 | Claussen et al. | 715/205 |
| 6,480,860 B1 | 11/2002 | Monday | 707/102 | 6,986,104 B2 | 1/2006 | Green et al. | 715/523 |
| 6,493,006 B1 | 12/2002 | Gourdol et al. | 345/825 | 6,990,654 B2 | 1/2006 | Carroll, Jr. | 717/109 |
| 6,498,982 B2 | 12/2002 | Bellesfield et al. | 701/202 | 7,003,522 B1 | 2/2006 | Reynar et al. | 707/10 |
| 6,510,504 B2 | 1/2003 | Satyanarayanan | 711/170 | 7,013,289 B2 * | 3/2006 | Horn et al. | 705/26 |
| 6,516,321 B1 | 2/2003 | De La Huerga | 707/102 | 7,024,658 B1 | 4/2006 | Cohen et al. | 717/117 |
| 6,519,557 B1 | 2/2003 | Emens et al. | 704/8 | 7,028,312 B1 | 4/2006 | Merrick et al. | 719/330 |
| 6,519,603 B1 | 2/2003 | Bays et al. | 707/102 | 7,032,174 B2 | 4/2006 | Montero et al. | 715/257 |
| 6,546,433 B1 | 4/2003 | Matheson | 709/318 | 7,039,859 B1 | 5/2006 | Sundaresan | 715/229 |
| 6,553,385 B2 | 4/2003 | Johnson et al. | 707/104.1 | 7,051,076 B2 | 5/2006 | Tsuchiya | 709/206 |
| 6,556,972 B1 | 4/2003 | Bakis et al. | 704/277 | 7,082,392 B1 | 7/2006 | Butler et al. | 704/233 |
| 6,556,984 B1 | 4/2003 | Zien | 707/2 | 7,100,115 B1 | 8/2006 | Yennaco | 715/748 |
| 6,564,264 B1 | 5/2003 | Creswell et al. | 709/245 | 7,113,976 B2 | 9/2006 | Watanabe | 709/206 |
| 6,571,241 B1 | 5/2003 | Nosohara | 707/6 | 7,146,564 B2 | 12/2006 | Kim et al. | 715/235 |
| 6,571,253 B1 | 5/2003 | Thompson et al. | 707/103 R | 7,216,351 B1 | 5/2007 | Maes | 719/328 |
| 6,591,260 B1 | 7/2003 | Schwarzhoff et al. | 707/2 | 7,237,190 B2 | 6/2007 | Rollins et al. | 715/234 |
| 6,595,342 B1 | 7/2003 | Maritzen et al. | 194/212 | 7,281,245 B2 | 10/2007 | Reynar et al. | 717/173 |
| 6,601,075 B1 | 7/2003 | Huang et al. | 707/104.1 | 7,302,634 B2 | 11/2007 | Lucovsky et al. | 715/200 |
| 6,604,099 B1 | 8/2003 | Chung et al. | 707/3 | 7,305,354 B2 | 12/2007 | Rodriguez et al. | 705/26 |
| 6,615,131 B1 | 9/2003 | Rennard et al. | 701/200 | 7,392,479 B2 | 6/2008 | Jones et al. | 715/234 |
| 6,618,733 B1 | 9/2003 | White et al. | 707/103 | 7,421,645 B2 | 9/2008 | Reynar | 715/206 |
| 6,622,140 B1 | 9/2003 | Kantrowitz | 707/5 | 7,454,459 B1 | 11/2008 | Kapoor et al | 709/203 |
| 6,623,527 B1 * | 9/2003 | Hamzy | 715/513 | 2001/0029605 A1 | 10/2001 | Forbes et al. | 717/170 |
| 6,625,581 B1 | 9/2003 | Perkowski | 705/27 | 2001/0041328 A1 | 11/2001 | Fisher | 434/157 |
| 6,629,079 B1 | 9/2003 | Spiegel et al. | 705/26 | 2001/0042098 A1 | 11/2001 | Gupta et al. | 709/206 |
| 6,631,519 B1 | 10/2003 | Nicholson et al. | 717/169 | 2001/0049702 A1 | 12/2001 | Najmi | 707/234 |
| 6,636,880 B1 | 10/2003 | Bera | 708/206 | 2001/0056461 A1 | 12/2001 | Kampe et al. | 709/201 |
| 6,643,650 B1 | 11/2003 | Slaughter et al. | 707/10 | 2002/0002590 A1 | 1/2002 | King et al. | 709/206 |
| 6,654,734 B1 | 11/2003 | Mani et al. | 707/2 | 2002/0003469 A1 | 1/2002 | Gupta | 340/407 |
| 6,654,932 B1 | 11/2003 | Bahrs et al. | 715/210 | 2002/0003898 A1 | 1/2002 | Wu | 382/187 |
| 6,658,623 B1 * | 12/2003 | Schilit et al. | 715/513 | 2002/0004803 A1 | 1/2002 | Serebrennikov | 715/513 |
| 6,687,485 B2 | 2/2004 | Hopkins et al. | 434/350 | 2002/0007309 A1 | 1/2002 | Reynar | 705/14 |
| 6,694,307 B2 | 2/2004 | Julien | 707/3 | 2002/0023113 A1 | 2/2002 | Hsing et al. | 715/513 |
| 6,697,824 B1 | 2/2004 | Bowman-Amuah | 709/223 | 2002/0023136 A1 | 2/2002 | Silver et al. | 709/206 |
| 6,697,837 B1 | 2/2004 | Rodov | 709/203 | 2002/0026450 A1 | 2/2002 | Kuramochi | 707/104.1 |
| 6,708,189 B1 | 3/2004 | Fitzsimons et al. | 707/205 | 2002/0029304 A1 | 3/2002 | Reynar et al. | 719/332 |
| 6,715,144 B2 | 3/2004 | Daynes et al. | 717/174 | 2002/0035581 A1 | 3/2002 | Reynar et al. | 715/513 |
| 6,717,593 B1 | 4/2004 | Jennings | 715/760 | 2002/0038180 A1 | 3/2002 | Bellesfield et al. | 701/202 |
| 6,718,516 B1 | 4/2004 | Claussen et al. | 715/513 | 2002/0065110 A1 * | 5/2002 | Enns et al. | 455/566 |
| 6,728,679 B1 | 4/2004 | Strubbe et al. | 704/270.1 | 2002/0065891 A1 | 5/2002 | Malik | 709/206 |
| 6,732,090 B2 | 5/2004 | Shanahan et al. | 707/3 | 2002/0066073 A1 | 5/2002 | Lienhard et al. | 717/105 |
| 6,732,361 B1 | 5/2004 | Andreoli et al. | 719/313 | 2002/0078222 A1 | 6/2002 | Compas et al. | 709/232 |
| 6,741,994 B1 | 5/2004 | Kang et al. | 707/102 | 2002/0091803 A1 | 7/2002 | Imamura et al. | 709/220 |
| 6,742,054 B1 | 5/2004 | Upton, IV | 710/6 | 2002/0099687 A1 | 7/2002 | Krishnaprasad et al. | 707/1 |
| 6,745,208 B2 | 6/2004 | Berg et al. | 707/201 | 2002/0100036 A1 | 7/2002 | Moshir et al. | 717/173 |
| 6,766,326 B1 | 7/2004 | Cena | 707/101 | 2002/0103829 A1 | 8/2002 | Manning et al. | 715/513 |
| 6,795,808 B1 | 9/2004 | Strubbe et al. | 704/275 | 2002/0104080 A1 | 8/2002 | Woodard et al. | 717/176 |
| 6,802,061 B1 | 10/2004 | Parthasarathy et al. | 717/173 | 2002/0110225 A1 | 8/2002 | Cullis | 379/67.1 |
| 6,826,726 B2 | 11/2004 | Hsing et al. | 715/513 | 2002/0111928 A1 | 8/2002 | Haddad | 707/1 |
| 6,829,631 B1 | 12/2004 | Forman et al. | 709/202 | 2002/0120685 A1 | 8/2002 | Srivastava et al. | 709/203 |
| 6,845,499 B2 | 1/2005 | Srivastava et al. | 717/100 | 2002/0129107 A1 | 9/2002 | Loughran et al. | 709/206 |
| 6,857,103 B1 | 2/2005 | Wason | 715/709 | 2002/0133523 A1 | 9/2002 | Ambler et al. | 715/536 |
| 6,859,908 B1 | 2/2005 | Clapper | 715/224 | 2002/0149601 A1 | 10/2002 | Rajarajan et al. | 345/619 |
| 6,868,525 B1 | 3/2005 | Szabo | 715/738 | 2002/0156774 A1 | 10/2002 | Beauregard et al. | 707/3 |
| 6,874,125 B1 | 3/2005 | Carroll et al. | 715/705 | 2002/0156792 A1 | 10/2002 | Gombocz et al. | 707/100 |
| 6,874,143 B1 | 3/2005 | Murray et al. | 717/173 | 2002/0169802 A1 * | 11/2002 | Brewer et al. | 707/513 |
| 6,880,129 B1 | 4/2005 | Lee et al. | 715/763 | 2002/0175955 A1 | 11/2002 | Gourdol et al. | 715/821 |
| 6,883,137 B1 | 4/2005 | Girardot et al. | 715/513 | 2002/0178008 A1 * | 11/2002 | Reynar | 704/272 |
| 6,898,604 B1 | 5/2005 | Ballinger et al. | 707/101 | 2002/0178182 A1 | 11/2002 | Wang et al. | 715/501.1 |
| 6,901,402 B1 | 5/2005 | Corston-Oliver et al. | 701/101 | 2002/0184247 A1 | 12/2002 | Jokela et al. | 707/204 |
| 6,904,560 B1 | 6/2005 | Panda | 715/202 | 2002/0188941 A1 | 12/2002 | Cicciarelli et al. | 717/175 |
| 6,925,457 B2 | 8/2005 | Britton et al. | 707/1 | 2002/0196281 A1 | 12/2002 | Audleman et al. | 715/762 |
| 6,925,470 B1 | 8/2005 | Sangudi et al. | 707/102 | 2002/0198909 A1 * | 12/2002 | Huynh et al. | 707/513 |
| 6,944,857 B1 | 9/2005 | Glaser et al. | 717/173 | 2003/0002391 A1 | 1/2003 | Biggs | 368/82 |
| 6,948,133 B2 | 9/2005 | Haley | 715/780 | 2003/0005411 A1 | 1/2003 | Gerken | 717/120 |
| 6,950,831 B2 | 9/2005 | Haley | 707/104.1 | 2003/0009489 A1 | 1/2003 | Griffin | 707/500 |
| 6,950,982 B1 | 9/2005 | Dourish | 715/512 | 2003/0014745 A1 | 1/2003 | Mah et al. | 717/170 |
| 6,957,385 B2 | 10/2005 | Chan et al. | 715/504 | 2003/0025728 A1 | 2/2003 | Ebbo et al. | 715/744 |
| 6,963,867 B2 | 11/2005 | Ford et al. | 707/3 | 2003/0046316 A1 | 3/2003 | Gergic et al. | 715/234 |
| 6,964,010 B1 | 11/2005 | Sharp | 715/225 | 2003/0050911 A1 | 3/2003 | Lucovsky et al. | 707/1 |

| | | | |
|---|---|---|---|
| 2003/0051236 A1 | 3/2003 | Pace et al. | 717/177 |
| 2003/0056207 A1 | 3/2003 | Fischer et al. | 717/174 |
| 2003/0081791 A1* | 5/2003 | Erickson et al. | 380/282 |
| 2003/0083910 A1 | 5/2003 | Sayal et al. | 705/7 |
| 2003/0084138 A1 | 5/2003 | Tavis et al. | 709/223 |
| 2003/0097318 A1 | 5/2003 | Yu et al. | 705/35 |
| 2003/0101190 A1 | 5/2003 | Horvitz et al. | 707/100 |
| 2003/0101204 A1 | 5/2003 | Watson | 708/206 |
| 2003/0101416 A1 | 5/2003 | McInnes et al. | 715/513 |
| 2003/0106040 A1 | 6/2003 | Rubin et al. | 717/106 |
| 2003/0115039 A1 | 6/2003 | Wang | 704/4 |
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0167445 A1 | 9/2003 | Su et al. | 715/239 |
| 2003/0172343 A1 | 9/2003 | Leymaster et al. | 715/500 |
| 2003/0177341 A1 | 9/2003 | Devillers | 712/227 |
| 2003/0182391 A1 | 9/2003 | Leber et al. | 709/217 |
| 2003/0192040 A1 | 10/2003 | Vaughan | 717/173 |
| 2003/0195937 A1 | 10/2003 | Kircher et al. | 709/207 |
| 2003/0212527 A1 | 11/2003 | Moore et al. | 702/179 |
| 2003/0220795 A1* | 11/2003 | Arayasantiparb et al. | 704/275 |
| 2003/0229593 A1 | 12/2003 | Raley et al. | 705/55 |
| 2003/0233330 A1 | 12/2003 | Raley et al. | 705/55 |
| 2004/0002939 A1 | 1/2004 | Arora et al. | 707/1 |
| 2004/0003389 A1 | 1/2004 | Reynar et al. | 717/178 |
| 2004/0006564 A1 | 1/2004 | Lucovsky et al. | 707/10 |
| 2004/0006741 A1 | 1/2004 | Radja et al. | 715/513 |
| 2004/0024875 A1 | 2/2004 | Horvitz et al. | 709/226 |
| 2004/0039990 A1 | 2/2004 | Bakar et al. | 715/505 |
| 2004/0044959 A1 | 3/2004 | Shanmugasundaram et al. | 715/227 |
| 2004/0068694 A1 | 4/2004 | Kaler et al. | 715/513 |
| 2004/0083218 A1 | 4/2004 | Feng | 707/100 |
| 2004/0133846 A1* | 7/2004 | Khoshatefeh et al. | 715/500 |
| 2004/0143581 A1 | 7/2004 | Bohannon et al. | 707/100 |
| 2004/0165007 A1* | 8/2004 | Shafron | 345/781 |
| 2004/0199861 A1 | 10/2004 | Lucovsky | 715/500 |
| 2004/0201867 A1 | 10/2004 | Katano | 358/1.15 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0094850 A1 | 5/2005 | Nakao | 382/103 |
| 2005/0108195 A1 | 5/2005 | Yalovsky et al. | 707/1 |
| 2005/0120313 A1* | 6/2005 | Rudd et al. | 715/866 |
| 2005/0187926 A1 | 8/2005 | Britton et al. | 707/3 |
| 2006/0173674 A1 | 8/2006 | Nakajima et al. | 704/9 |

FOREIGN PATENT DOCUMENTS

| | | |
|---|---|---|
| CN | ZL 200410005390.8 | 10/2008 |
| EP | 0 364 180 A2 | 4/1990 |
| EP | 0481784 A2 | 4/1992 |
| EP | 0598511 A2 | 5/1994 |
| EP | 1093058 A1 | 4/2001 |
| EP | 1280068 A2 | 1/2003 |
| EP | 1361523 A2 | 11/2003 |
| EP | 1376392 A2 | 1/2004 |
| EP | 1 447 754 A1 | 8/2004 |
| EP | 1 452 966 A3 | 9/2004 |
| JP | 64-88771 | 4/1989 |
| JP | 05-174013 | 7/1993 |
| JP | 08-272662 | 10/1996 |
| JP | 09-138636 | 5/1997 |
| JP | 10-171827 | 6/1998 |
| JP | 2000-222394 | 8/2000 |
| JP | 2000-231566 | 8/2000 |
| JP | 2001-014303 | 1/2001 |
| JP | 2001-125994 | 5/2001 |
| JP | 2001-522112 | 11/2001 |
| JP | 2001-0350464 | 12/2001 |
| JP | 2002-041353 | 2/2002 |
| JP | 2002163250 A | 6/2002 |
| JP | 2002-222181 | 8/2002 |
| JP | 2003-141174 | 5/2003 |
| WO | WO 95/07510 A1 | 3/1995 |
| WO | WO 99/17240 A1 | 4/1999 |
| WO | WO 00/54174 A1 | 9/2000 |
| WO | WO 00/67117 | 11/2000 |
| WO | WO 00/73949 A1 | 12/2000 |
| WO | WO 01/37170 A2 | 5/2001 |
| WO | WO 02/99627 A1 | 1/2002 |
| WO | WO 02/15518 A2 | 2/2002 |
| WO | WO 02/42928 | 5/2002 |
| WO | WO 2004/012099 A2 | 2/2004 |

OTHER PUBLICATIONS

European Communication dated Sep. 25, 2006 in EP 03 01 4181.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.

European Communication dated Apr. 19, 2006 in EP 05 000 506.5-1527.

European Communication dated Nov. 9, 2006 in EP 03010292.5.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.

"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.

U.S. Office Action dated Nov. 9, 2006 cited in U.S. Appl. No. 10/184,298.

U.S. Office Action dated Nov. 15, 2006 cited in U.S. Appl. No. 10/179,438.

U.S. Final Official Action dated Oct. 19, 2006, U.S. Appl. No. 09/906,467.

U.S. Final Official Action dated Oct. 5, 2006 cited in U.S. Appl. No. 09/841,266.

U.S. Official Action dated Oct. 6, 2006 cited in U.S. Appl. No. 10/140,544.

U.S. Official Action dated Oct. 10, 2006 cited in U.S. Appl. No. 09/841,265.

U.S. Official Action dated Sep. 7, 2006 cited in U.S. Appl. No. 10/155,680.

European Communication dated Feb. 16, 2007 cited in European Application No. 04 003 683.2-2211.

Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.

Rice, F.C., "Transform XML Files with XSLT When Importing into Microsoft Excel 2002," Jul. 2001, Internet article XP-002420701, http://msdn2.microsoft.com/en-us/library/aa140055(office.10.d=printer).aspx, 9 pgs.

Johnson, L., "What's So Special About Paste Special?", Jun. 2002, Internet article, XP-002420702, http://pubs.logicalexpressions.com/Pub0009/LPMArticle.asp?ID=40, 5 pgs.

Anonymous, "Moving and Copying Text Tutorial," Aug. 17, 2001, Internet Article, XP-002307566, http://tutorials.findtutorials.com/read/category/102/id/342/p/3, 4 pgs.

U.S. Official Action dated Apr. 10, 2007 cited in U.S. Appl. No. 09/907,418.

European Communication dated Nov. 17, 2006 in EP 03 011 851.7—2211.

European Communication dated Dec. 11, 2006 in EP 03 012 830.0-2211.
Singapore Search Report/Written Opinion dated Jan. 26, 2007 in SG 200500214-2.
U.S. Official Action dated Feb. 6, 2007 cited in U.S. Appl. No. 09/588,411.
U.S. Official Action dated Feb. 21, 2007 cited in U.S. Appl. No. 10/366,141.
"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.
"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.
U.S. Official Action dated Jan. 5, 2007 in U.S. Appl. No. 10/183,717.
U.S. Official Action dated Jan. 11, 2007 in U.S. Appl. No. 10/184,190.
U.S. Official Action dated May 14, 2007 cited in U.S. Appl. No. 09/906,552.
U.S. Final Official Action dated May 18, 2007 cited in U.S. Appl. No. 10/155,680.
U.S. Official Action dated May 30, 2007 cited in U.S. Appl. No. 09/906,467.
Blaheta et al., "Assigning Function Tags to Parsed Text," Morgan Kaufmann Publishers Inc., 2000, pp. 234-240.
U.S. Office Action dated Jun. 28, 2007 cited in U.S. Appl. No. 09/841,266.
U.S. Final Office Action dated Jul. 12, 2007 cited in U.S. Appl. No. 10/184,298.
U.S. Office Action dated Jul. 20, 2007 cited in U.S. Appl. No. 09/841,265.
European Communication dated Sep. 25, 2007 cited in European Application No. 03 014 181.6—1243.
Japanese Official Action dated Oct. 19, 2007 cited in Japanese Application No. 2003-128417.
Russian Official Action dated Oct. 11, 2008 cited in Russian Application No. 2003118722.
Pershikov, V.I., "Explanatory Dictionary in Informatics," Finances and Statistics, Moscow, 1991 (in Russian with translated sections) 5 pgs.
U.S. Final Office Action dated Dec. 18, 2007 cited in U.S. Appl. No. 10/366,141.
U.S. Office Action dated Oct. 9, 2007 cited in U.S. Appl. No. 10/183,317.
U.S. Final Office Action dated Oct. 16, 2007 cited in U.S. Appl. No. 09/907,418.
U.S. Office Action dated Oct. 17, 2007 cited in U.S. Appl. No. 10/155,680.
U.S. Final Office Action dated Oct. 19, 2007 cited in U.S. Application No. 10/184,190.
U.S. Final Office Action dated Oct. 19, 2007 cited in U.S. Application No. 09/588,411.
U.S. Final Office Action dated Oct. 30, 2007 cited in U.S. Application No. 09/906,552.
Malaysian Search Report dated Aug. 2, 2007 cited in Malaysian Application No. PI 20040265.
Perry, Brad, et al., "Discovering Similar Resources by Content Park-Linking", Proceedings of the Sixth International Conference on Information and Knowledge Management, published by ACM Press 1997, pp. 317-324.
Schulz, Charles, "Writing Applications for Uniform Operation on a Mainframe or PC: A Metric Conversion Program", Lockheed Missles & Space Company, Inc., Sunnyvale, CA, May 1990, pp. 348-361.
Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.
M. Fernandez et al., "SilkRoute: trading between relations and XML", Computer Networks, vol. 33, No. 1-6, Jun. 2000, pp. 723-745.

V. Braganholo, "Updating Relational Databases Through XML Views", Technical Report, Sep. 2002, pp. 1-61.
G. Falquet et al., "Design and Analysis of Active Hypertext Views on Databases", Information Sciences Institute, Jan. 2002, pp. 1-24.
S. Ceri et al., "Deriving Production Rules for Incremental View Maintenance", Proceedings of the 17th International Conference on Very Large Data Bases, Sep. 1991, pp. 577-589.
A. Bonifati, "Active Behaviors within XML Document Management", EDBT Ph. D. Workshop, Mar. 2000, pp. 1-4.
"Integrated Development Enviorment (IDE)", http://web.archive.org/web/20020602032242/http:altova.com/productside.html, Jun. 2002, pp. 1-2.
"Altova markup your mind!" http://web.archive.org/web/20021204211721/http://altova.com/products_ide.html, Dec. 2002, pp. 1-3.
Arbortext, "Arbortext and Accessibility", http://web.archive.org/web/20021219133536/www.arbortext.com/html/accessibility.html, Dec. 2002, pp. 1-5.
Arbortext, "XML Compliance, 100% Pure XML", http:web.archive.org/web/20021209185855/www.arbortext.com/html/xml_compliance, Dec. 2002, pp. 1-3.
Arbortext, "Schemas", http://web.archive.org/web/20021221023148/www.arbortext.com/html/schemas.html, Dec. 2002, pp. 1-3.
Arbortext, "Arbortext's Support for XSL-FO", http://web.archive.org/web/20021221021632/www.arbortext.com/html/xsl-fo.html, Dec. 2002, pp. 1-4.
Corel, "Corel XMetal4, Making XML Content Creation Easy", http://web.archive.org/web/20031118215158/www.corel.com/servlet/Satellite?pagename, Nov. 2003, pp. 1-2.
Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.
Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.
Brooks-Bilson, "Programming ColdFusion" [electronic resource] 2001, Safari Tech Books Online, 1st Edition, 25 pp.
Wilker, John, "ColdFusion MX Adds J2EE, XML, and Web Services Compatibility", Aug. 9, 2002, http://builder.com.com/5102-6387-104585.html, 3 pp.
Components, subsection "Choosing Your Applets, and Controls", 16 pp.
Flanagan, D., "JavaScript—The Definitive Guide, Fourth Edition", Jan. 2002, O'Reilly, 12 pp.
Brockschmidt, K., "Inside OLE, Second Edition", 1995, Microsoft Press, p. 169.
Toth, V., "Visual C++ 4 Unleashed", 1996, Sams Publishing, p. 174.
Sriram, V., "ComponentXchange: An E-Exchange for Software Components", Master Thesis, CitSeer, May 2001, pp. i-v, 1-77.
Bosak, "XML: The Universal Publishing Format", SGML/XML Europe '98, May 1998, pp. A1-C17.
Kristensen, "Template Resolution in XML/HTML", Computer Networks and ISDN Systems, vol. 30, 1998, pp. 239-249.
Fan et al., "FormPlus: A Form Authoring Toolkit", Proceedings of the Fourteenth Annual Computer Software and Applications Conference, Oct. 31, 1990-Nov. 2, 1990, pp. 255-260.
Boone, "Concept Features in Re: Agent, An Intelligent Email Agent", Proceedings of the 2nd International Conference on Autonomous Agents, May 9-13, 1998, pp. 141-148.
Takkinen et al., "Café: A Conceptual Model for Managing Information in Electronic Mail", Proceedings of the Annual Hawaii International Conference on System Sciences, 1998, pp. 44-53.
"Smart Tags: Dumb Technology?", webreference.com, Online, Aug. 29, 2001, http;//www.webreference.com/xml/column30/3.html, 3 pp.
"Being 'Smart' with Smart Tags in Office XP", Create for Mississippi, Aug. 2001, http://www.create.cett.msstate.edu/create/howto/smart_tags.pdf, 7 pp.
Marais, Hannes, "Supporting Cooperative and Personal Surfing With a Desktop Assistant", 1997, ACM Press, pp. 129-138.

U.S. Final Official Action dated Aug. 18, 2006 cited in U.S. Appl. No. 09/907,418.
U.S. Final Official Action dated Jul. 19, 2006 in U.S. Appl. No. 09/906,552.
U.S. Official Action dated May 26, 2006 in U.S. Appl. No. 09/588,411.
U.S. Final Office Action dated Dec. 26, 2007 cited in U.S. Appl. No. 09/841,265.
U.S. Office Action dated Dec. 26, 2007 cited in U.S. Appl. No. 10/377,258.
U.S. Final Office Action dated Jan. 9, 2008 cited in U.S. Appl. No. 09/906,467.
David D. Lewis et al., "A Sequential Algorithm for Training Text Classifiers," Spring-Verlag New York, Inc., 1994, pp. 1-10.
Singapore Examination Reported (conducted by Austrian Patent Office) dated Jan. 25, 2008 cited in SG Application No. 200500214-2.
Chinese Official Action dated Dec. 28, 2007 cited in Application No. 200410005390.8.
Chinese Official Action dated Jan. 4, 2008 cited in Application No. 200510009487.0.
Wei Ying-bin et al., "A New Technology ColdFusion of Realizing Dynamic Webpage," 2000, 6 pgs. (English language translation, pp. 1-6).
European Examination Report dated Mar. 4, 2006 cited in EP Application No. 02 014 717.9-1527.
European Examination Report dated Mar. 4, 2006 cited in EP Application No. 03 012 432.5-1527.
Russian Official Action dated Jan. 11, 2008 cited in Russian Application No. 2004105880/09(006292).
V. Doroth et al., "Modern Computer Vocabulary," St. Petersburg, BHV-Peterburg, 2001, p. 465 (with English language translation).
U.S. Official Action mailed Apr. 1, 2008 cited in U.S. Appl. No. 09/907,418.
U.S. Official Action mailed Apr. 4, 2008 cited in U.S. Appl. No. 10/155,680.
U.S. Official Action mailed May 1, 2008 cited in U.S. Appl. No. 10/183,317.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
Polish Official Letter dated Jun. 24, 2008 cited Polish Application No. P 365553.
U.S. Final Office Action dated Jul. 29, 2008 cited in U.S. Appl. No. 10/141,712.
"XML Schema Part 2:Datatypes," W3C, May 2, 2001, http://www.w3.org/TR/2001/REC-xmlschema-2-20010502/, pp. 1-146 (separated into 2 documents—A & B).
U.S. Office Action dated Aug. 1, 2008 cited in U.S. Appl. No. 10/366,141.
Ghamrawi et al., "Collective Multi-Label Classification," ACM, 2005, pp. 195-200.
Polish Official Action dated Jul. 21, 2008 cited in Polish Application No. P 364854.
Japanese Office Action dated Jul. 18, 2008 cited in Japanese Application No. 2002-207514.
Rubin, C., "Microsoft Word 2000 Official Manual", First Edition, Nikkei BP Soft Press, Inc., Aug. 2, 1999, pp. 215-217.
U.S. Office Action dated May 27, 2008 cited in U.S. Appl. No. 09/906,552.
U.S. Examiner's Answer BPAI dated Jun. 5, 2008 cited in U.S. Appl. No. 10/184,298.
U.S. Office Action dated Jun. 11, 2008 cited in U.S. Appl. No. 09/841,265.
U.S. Office Action dated Jun. 13, 2008 cited in U.S. Appl. No. 10/780,376.
U.S. Final Office Action dated Jun. 27, 2008 cited in U.S. Appl. No. 10/377,258.
M. Stowe, "XML in Excel and the Spreadsheet Component", Microsoft Corporation, Aug. 2001, 6 pgs.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.
European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited in Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 18, 2008 cited in Japanese Application No. 2003-128417.
European Communication Minutes of Oral Proceedings and Decision dated Sep. 15, 2008 in European Application No. 05 000 506.5-1527.
Polish Second Official Action dated Oct. 28, 2008 in Polish Application No. P36553.
Japanese Office Action dated Oct. 10, 2008 cited in Application No. 2004-037158.
Chinese Office Action dated Oct. 17, 2008 cited in Application No. 03145242.6.
U.S. Final Office Action dated Dec. 8, 2008 cited in U.S. Appl. No. 10/183,317.
"The Spatial Smart Tag", Geomatic Technologies, Mar. 10, 2005, 2 pp.
Harmon, D., "Microsoft MapPoint 2002", Geoworld Quick-Take Reviews, Aug. 2001, 3 pp.
Irie R. et al., "Resources for Place Name Analysis", May 28, 2004, 4 pp.
Rajabifard, A. et al., "Creating an Enabling Platform for the Delivery of Spatial Information", Spatial Sciences Institute Biennial Conference, Sep. 12, 2005, 10 pp.
Camarda, B., Special Editing Using® Microsoft® Office Word 2003, Que, Dec. 12, 2003, pp. 1-5.
Ivens, K., Office XP Smart Tags, Microsoft, Mar. 6, 2002, pp. 1-4.
Frye, C., Microsoft Office Systems: Step by Step, Microsoft Press, 2003 Edition, Sep. 3, 2003, pp. 1-6.
U.S. Official Action mailed Sep. 8, 2006 in U.S. Appl. No. 10/948,948.
U.S. Official Action mailed Feb. 15, 2007 in U.S. Appl. No. 10/948,948.
U.S. Official Action mailed Oct. 18, 2007 in U.S. Appl. No. 10/948,948.
U.S. Official Action mailed Mar. 20, 2008 in U.S. Appl. No. 10/948,48 .
U.S. Official Action mailed Oct. 16, 2008 in U.S. Appl. No. 10/948,948.
U.S. Official Action mailed Oct. 16, 2008 in U.S. Appl. No. 10/154,630.
European Search Report dated Dec. 12, 2006 in European Application No. 05 105 000.3-1527.
European Examination Report dated Oct. 9, 2007 in European Application No. 05 105 000.3-1527.
European Preliminary Opinion dated Aug. 27, 2008 cited in European Application No. 04002224.6 -1527 / 1447754 .
Chinese Official Action dated Dec. 7, 2007 in Chinese Application No. 200510088529.4.
Chinese Second Official Action dated Aug. 15, 2008 in Chinese Application No. 200510088529.4.
Chilean Second Office Action cited in Chilean Application No. 67-2005.
Malaysian Official Action dated Aug. 29, 2008 cited in Malaysian Application No. PI 20031902.
Polish Official Action dated Aug. 27, 2008 in Polish Application No. P360520.
Australian First Official Action dated Oct. 21, 2008 cited in Application No. 2003204800.
U.S. Final Office Action dated Dec. 24, 2008 cited in U.S. Appl. No. 09/841,265.

Sharon Oviatt et al., "Integration and Synchronization of Input Modes during Multimodal Human-Computer Interaction," CHI 97, Atlanta, Georgia, Mar. 22-27, 1997, pp. 415-422.

U.S. Office Action dated Dec. 23, 2008 cited in U.S. Appl. No. 10/179,810.

U.S. Office Action dated Jan. 5, 2009 cited in U.S. Appl. No. 10/141,712.

European Statement regarding Grounds of Appeal dated Jan. 13, 2009 cited in Application No. 04 002 224.6.

Hara, T. et al., "Inside Microsoft.NET-Complete Explanation, 'What Microsoft Aims For'", msdn magazine, No. 6, pp. 20-35, ASCII, Japan, Sep. 18, 2000, 19 pp.

Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese— no translation yet).

"Adding Data from Other Source in Power Point 2002," Internet Article, The McGraw-Hill Companies, Inc., Dec. 21, 2002, http://web.archive.org/web/20021221085214/http://www.glencoe.com/ps/computered/pas/article.php4?articleID=437.

U.S. Final Office Action dated Jan. 22, 2009 cited in U.S. Appl. No. 10/366,141.

U.S. Office Action dated Feb. 4, 2009 cited in U.S. Appl. No. 10/377,258.

U.S. Final Office Action dated Mar. 4, 2009 cited in U.S. Appl. No. 10/780,376.

European Summons to Attend Oral Proceedings dated Feb. 26, 2009 cited in European Application No. 0301283.0-2211 (60001.0182EP01).

European Communication dated Mar. 18, 2009 cited in European Application No. 04003683.2-2211 (60001.0216EP01).

European Summons to Attend Oral Proceedings dated Mar. 20, 2009 cited in European Application No. 03012830.0 (60001.0182EP01).

Australian First Examiner's Report dated Sep. 15, 2008 cited in Australian Application No. 2003204379 (60001.0181AU01).

Japanese Final Official Action dated Nov. 25, 2008 cited in Japanese Application No. 2002-207514 (60001.0079JPI1).

Japanese Official Action dated Feb. 6, 2009 cited in Japanese Application No. 2003-180218 (60001.0190JP01).

Japanese Official Action dated Feb. 13, 2009 cited in Japanese Application No. 2003-162911 (60001.0181JP01).

Japanese Official Action dated Feb. 24, 2009 cited in Japanese Application No. 2003-161338 (60001.0182JP01).

Japanese Official Action dated Mar. 6, 2009 cited in Japanese Application No. 2004-042140 (60001.0216JP01).

Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53(with English language translation).

Mexican Official Action dated Feb. 11, 2009 cited in Application No. PA/a/2003/005451 (60001.0190MX01).

Chinese Final Rejection dated Mar. 13, 2009 cited in Application No. 03145242.6 (50037.0121CC01).

Japanese Final Rejection dated Mar. 17, 2090 cited in Application No. 2004-037158 (60001.0211JP01).

Japanese Final Rejection dated Apr. 3, 2009 cited in Application No. 2002-207514 (60001.0079JPI1).

C. Goldfarb, XML Handbook, 1$^{st}$ Ed., Pearson Education, Japan, May 10, 1999, pp. 246-254 (no English translation) (60001.0211JP01).

S. Tanaka, "Verifying the XML Schema Definition," XML Magazine, Shoeisha Co., Ltd., vol. 10, No. 3, Jul. 1, 2000, pp. 135-155 (no English translation) (60001.0211JP01).

U.S. Office Action dated Apr. 20, 2009 cited in U.S. Appl. No. 10/426,446 (60001.0240US01).

U.S. Office Action dated Apr. 27, 2009 cited in U.S. Appl. No. 10/154,630 (60001.0175US01).

Chinese Decision on Rejection dated Jul. 3, 2009 cited in Application No. 03143003.1.

European Summons to Attend Oral Proceedings dated Aug. 5, 2009 cited in Application No. 03003931.7.

Polish Official Notice dated Aug. 25, 2009 cited in Application No. P.365553/DP (60001.0216p101).

Australian Official Action dated Sep. 11, 2009 cited in Application No. 2003204478 (60001.0190au01).

Norwegian Official Action dated Aug. 24, 2009 cited in Application No. 2003 2550 (60001.0181no01).

Polish Official Notice dated Sep. 22, 2009 cited in Application No. P. 364854/DP (60001.0211p101).

Polish Official Notice dated Sep. 23, 2009 cited in Application No. P. 360520/DP (60001.0181p101).

Korean Official Action dated Sep. 30, 2009 cited in Application No. 10-2003-40988 (50037.0121ks01).

Japanese Official Notice of Final Rejection dated Oct. 2, 2009 cited in Application No. 2003-162911 (60001.0181jp01).

Malaysian Examination Report dated Nov. 30, 2009 cited in Application No. PI 20040559 (60001.0216MY01).

Australian Third Official Action dated Dec. 23, 2009 cited in Application No. 2003204478 (60001.0190AU01).

U.S. Office Action dated Oct. 22, 2009 cited in U.S. Appl. No. 10/377,258 (60001.0216US01).

Japanese Official Notice of Final Rejection dated Oct. 27, 2009 cited in Application No. 2003-161338 (60001.0182JP01).

Russian Official Action dated Jun. 21, 2009 cited in Application No. 2005104223/09(005505) (60001.0266RU01).

D. Richter, "Windows for professionals" (Win32 API programming for Windows NT 3.5 and Windows 95, translation from English, Moscow: Russian Edition, 1995, ISBN 5-7502-0010-8, pp. 26, 31, 215 (60001.0266RU01).

U.S. Final Office Action dated Nov. 30, 2009 cited in U.S. Appl. No. 10/179,810 (60001.0187US01).

Glover et al., "Inferring hierarchical Descriptions," ACM, 2002, pp. 507-514 (60001.0079USI1).

Japanese Official Action dated May 26, 2009 cited in Application No. 2005-039754.

Australian First Official Action Report dated Jan. 18, 2009 cited in Application No. 2004200459 (60001.0211AU01).

* cited by examiner

| EMPLOYEE PAYROLL | |
|---|---|
| FILE | EDIT |

SARAH JONES ▽
| FIND OFFICE LOCATION |
| GET PERSONNEL RECORD |

ADDRESS

HIRE DATE

SSN

*Fig. 5*

| EMPLOYEE PAYROLL | |
|---|---|
| FILE | EDIT |

JOE SMITH ▽
| SEND MAIL |
| ADD TO CONTACTS |
| GET EMPLOYEE ID |

SALARY

HIRE DATE

SSN

*Fig. 4*

| PERSONNEL RECORD | |
|---|---|
| FILE | EDIT |

<PNAME> JOE SMITH </PNAME>

<STREET> 123 WEST STREET </STREET>

<CITY> OKLAHOMA CITY </CITY> OK 45678

*Fig. 7*

| EMPLOYEE PAYROLL | |
|---|---|
| FILE | EDIT |

JOE SMITH ▽ | SEND MAIL
SALARY | ADD TO CONTACTS
HIRE DATE | GET EMPLOYEE ID
SSN | FIND OFFICE LOCATION
| GET PERSONNEL RECORD

*Fig. 6*

LEVERAGING MARKUP LANGUAGE DATA FOR SEMANTICALLY LABELING TEXT STRINGS AND DATA AND FOR PROVIDING ACTIONS BASED ON SEMANTICALLY LABELED TEXT STRINGS AND DATA

FIELD OF THE INVENTION

This invention relates to document creation and document viewing program modules. More particularly, this invention relates to methods and systems for leveraging markup language data applied to text strings or data for semantically labeling text strings or data and for providing actions based on semantically labeled text strings or data.

BACKGROUND OF THE INVENTION

Since the advent of the computer and software age, software developers have attempted to provide functionality to users that are contextual in nature. For example, software has been developed for detecting that a user is entering a date into a computer-generated document as the user is typing the date. Before the user can complete the date, the software application pops up today's date to the user and offers to automatically complete the date for the user. Other software has been developed for offering users helpful actions in response to certain data entered by the user. For example, if the user's word processor application recognizes that the user has entered a date, the user may be offered an action that will launch the user's electronic calendar to allow the user to check appointments or to verify information in her calendar for the entered date. It would be helpful to users if such systems could recognize and provide actions for a variety of different types of text strings and data, such as names, dates, stock symbols, book titles, etc. Unfortunately, recognition of such text strings and/or data types may be difficult.

In the case of name recognition, words entered into a text document by a user may be compared against a list of known names to assist in the recognition of a given word as a name. On the other hand, a text string such as a five-digit number that is intended by the user to indicate a zip code may not be readily recognizable and distinguishable from other five-digit numbers included in the text. Accordingly, the five-digit text string entered by the user may not be recognized as a zip code even though the user intends that text string to indicate a zip code.

In recent years, markup languages such as Extensible Markup Language (XML) have been developed to apply structure to text and data where text and data may be tagged with markup language elements to provide contextual structure to the text or data. For example, all person names in a text document may be annotated using Extensible Markup Language (XML) tags to provide structure to the document associated with text or data entered into the document of the type "person name." Subsequently, applications may be created for parsing the document to utilize data annotated with such markup language structure. For example, an application routine may be created to parse a text document and to utilize the XML structure associated with all names contained in the document to extract the names contained in the document for some other use. It would be helpful to leverage markup language annotation of a text or other data document to assist in recognizing text strings or data elements for providing helpful actions on those recognized text strings or data objects.

Because markup languages such as XML allow a wide range of creativity in naming markup language elements to be applied to text or data, it is common for different entities, such as two different companies to use slightly or greatly different XML element naming associated with the same type of text or data. For example, a first company may utilize an XML tag <name> for annotating names in a text or data document, and a second company may utilize an XML tag <personname> for annotating names in a text or data document. The two different entities, for example, companies, may create different sets of actions that may be called on when certain text or data types are recognized in their respective text or data documents. If the two entities decide for some reason to allow utilization of each other's text or data documents, such as the case in contract negotiations or a merger or acquisition between the two entities, or in any case in which one document creator is allowed to use a second document creator's text or data documents, it would be helpful if actions associated with recognized text strings or data objects associated with a first document marked up with XML structure according to a first XML definition used by one entity could be called upon for use in a second document in association with recognized test strings or data marked up with XML elements that are equivalent to differently named XML elements utilized in the first document.

Accordingly, there is a need for a method and system for leveraging markup language structure applied to text strings and data for providing helpful actions based on recognized and labeled text strings and data. It is with respect to these and other considerations that the present invention has been made.

SUMMARY OF THE INVENTION

Embodiments of the present invention provide methods and systems for leveraging markup language data applied to text or data for providing helpful actions on certain types of text or data such as names, addresses, dates, stock symbols, book titles, etc.

According to one aspect of the invention, text or data marked up with markup language data, such as Extensible Markup Language (XML) data, is passed by a host application, such as a word processor, spreadsheet application, web browser and the like, to one or more action dynamically linked libraries (DLL) for actions associated with the marked up text or data. For example, actions such as send mail, add to personal contacts, and the like, may be provided to text or data marked up with markup language data associated with a name. For another example, actions such as order this book may be provided for text or data marked up with markup language data associated with a book. After all available actions are identified, the actions are made available for use by the host application in connection with the marked up text or data.

According to another aspect of the invention, after any applicable actions for the marked up text or data are identified, the host application parses a namespace or schema library for markup language data types that have been established as equivalents to markup language data types associated with the text or data. Any equivalent data types are passed back to the action DLLs to determine if any additional actions are available for the marked up text or data based on the equivalent markup language data types. After all available actions are identified, the actions are made available for use by the host application in connection with the recognized and labeled text or data.

According to another aspect of the invention, text or data marked up with markup language data may be passed to one or more recognizer DLLs for leveraging the markup language data to recognize and label text or data not marked up with markup language data so that helpful actions may be applied to the recognized text or data. The recognizer DLLs utilize markup language data associated with the text or data to assist recognition and labeling of text or data. For example, XML markup of a text selection as a name may be used by a recognizer DLL to determine that text annotated with an XML name tag is indeed a name. For another example, XML markup of a city and state text selection may be used by a recognizer DLL to determine that an adjacent unannotated numeric text selection is a zip code. After all unannotated (not marked up with markup language data) text or data is recognized and labeled after one pass to an applicable recognizer DLL, the text selection may be passed back to the recognizer DLL along with associated XML data and any recognition and labeling data established during the previous pass through the recognizer DLL. During the second or subsequent pass through the recognizer DLL, the recognition and labeling previously applied along with associated XML data is utilized by the recognizer DLL to recognize and label text or data not recognized on a previous pass. The recognition process may continue iteratively until no new text or data is recognized.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIGS. 4, 5, 6 and 7 illustrate computer screen displays showing illustrative text strings and applicable actions for application to recognize text strings and showing illustrative XML markup of given text strings.

DETAILED DESCRIPTION OF THE PREFERRED EMBODIMENT

As described briefly above, embodiments of the present invention are directed to methods for leveraging markup language structure and data applied to text or data for providing helpful actions based on recognized and labeled text strings and data. In the following detailed description, references are made to the accompanying drawings that form a part hereof, and in which are shown by way of illustration specific embodiments or examples. These embodiments may be combined, other embodiments may be utilized, and structural changes may be made without departing from the spirit or scope of the present invention. The following detailed description is, therefore, not to be taken in a limiting sense and the scope of the present invention is defined by the appended claims and their equivalents.

Figure 1:
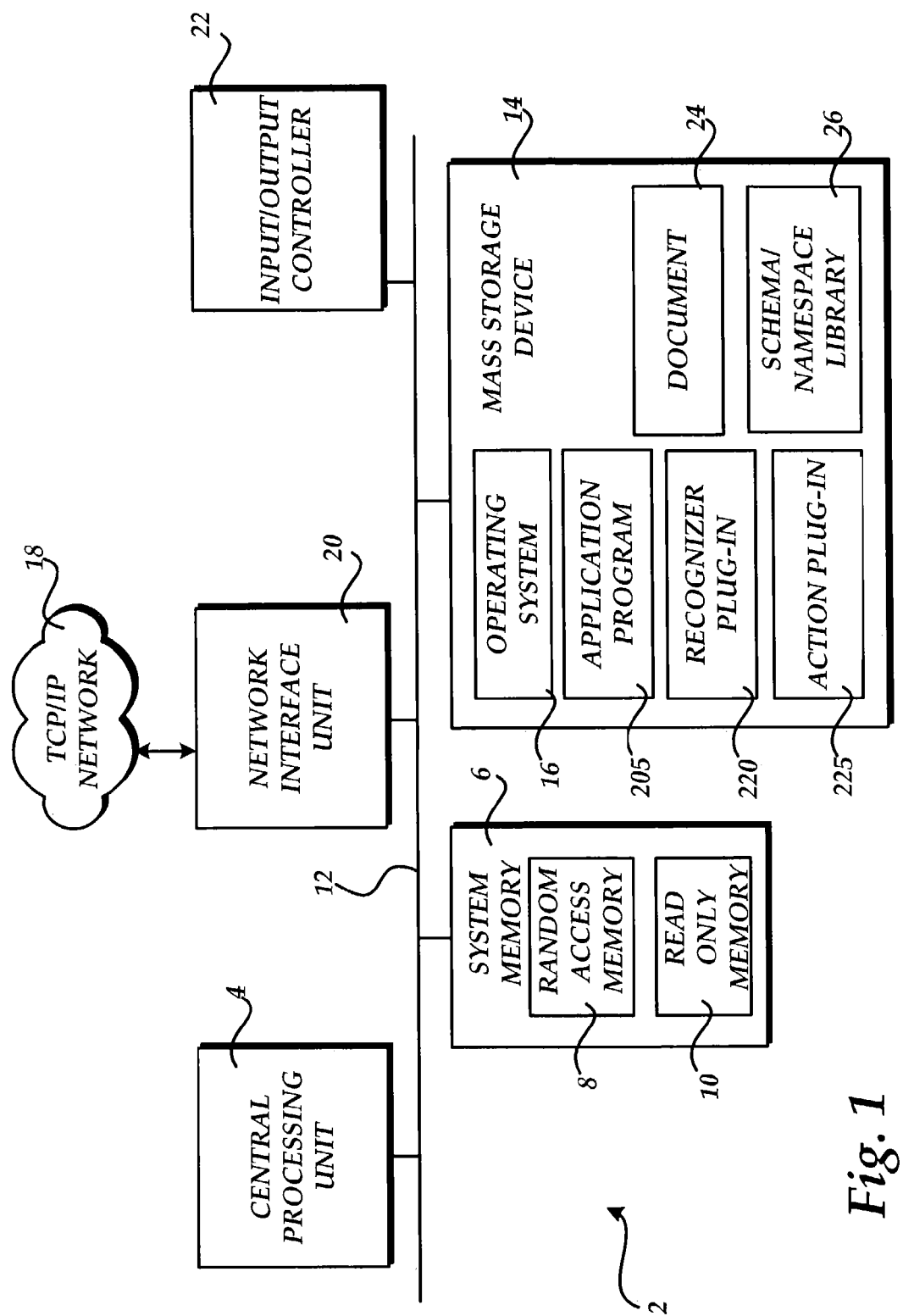
FIG. 1 is a block diagram showing the architecture of a personal computer that provides an illustrative operating environment for embodiments of the present invention.

Referring now to the drawings in which like numerals represent like elements throughout the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules. Additional aspects of an illustrative operating environment and software architecture for implementing the various embodiments of the present invention are described in U.S. patent application Ser. No. 09/588,411, entitled "Method and System for Semantically Labeling Strings and Providing Actions Based on Semantically Labeled Strings", which is expressly incorporated herein by reference.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS XP operating system from MICROSOFT CORPORATION of Redmond, Wash. The mass storage device 14 and RAM 8 may also store one or more application programs. In particular, the mass storage device 14 and RAM 8 may store an application program 205 for creating and editing an electronic document 24. For instance, the application program 205 may comprise a word processing application program a spreadsheet application, a contact application, and the like. Application programs for creating and editing other types of electronic documents may also be used with the various embodiments of the present invention.

Figure 2:
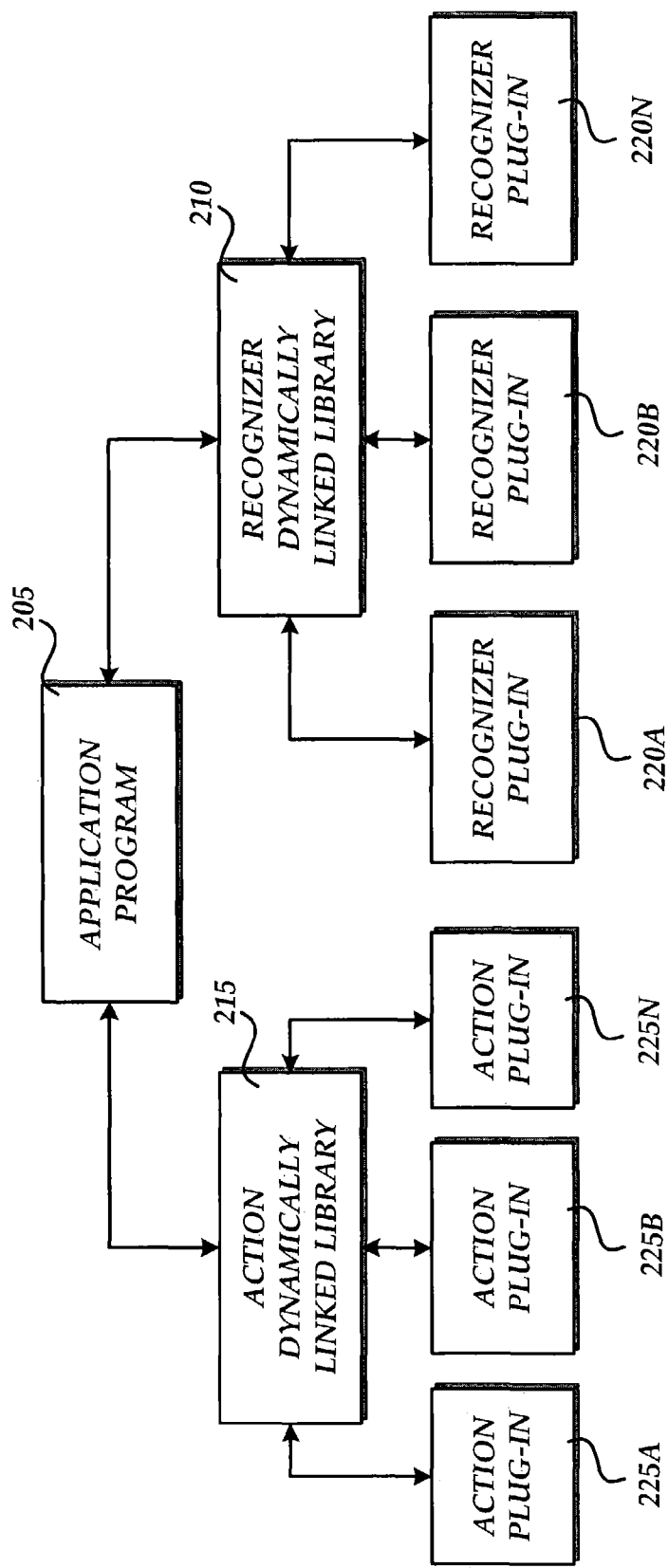
FIG. 2 is a block diagram that shows software architecture for recognizing, labeling, and performing actions on strings of text and/or data according to various embodiments of the present invention.

Referring now to FIG. 2, an illustrative software architecture for use in conjunction with the various embodiments of the present invention will be described. The architecture shown in FIG. 2 includes an application program 205, such as a word processor application program, a spreadsheet application program, or other type of application program for creating and editing electronic documents. The application program 205 may also comprise a Web browser.

The application program 205 is able to communicate with a recognizer dynamically linked library ("DLL") 210 and an action DLL 215. As will be described in greater detail below, the recognizer DLL 210 controls one or more recognizer plug-ins 220A-220N and the action DLL 215 controls one or more action plug-ins 225A-225N. According to embodiments of the present invention the recognizer DLL and the action DLL may be a shared software module integrated with the application program 205.

According to one embodiment of the invention, the recognizer plug-ins 220A-220N and the action plug-ins 225A-225N may be automation servers. Automation servers are well-known software components that are assembled into programs or add functionality to existing programs running on operating systems such as the WINDOWS XP operating system from MICROSOFT CORPORATION of Redmond, Wash. Automation servers may be written in a variety of computing languages and can be plugged and unplugged at runtime without having to recompile the host program. The recognizer plug-ins and action plug-ins may also be individual or integrated DLLs accessible by the application program 205.

According to one aspect of the invention, text or data marked up with markup language data, such as Extensible Markup Language (XML) data, is passed by the host application 205, such as a word processor, spreadsheet application, web browser and the like, to one or more action DLLs for actions associated with the marked up text or data. According to embodiments of the present invention, the application 205 annotates the marked up text or data in the document with user interface functionality to allow a user to identify the labeled text or data as a recognized word or data. For example, a name or other marked up text may be annotated with a dotted line underneath the recognized name or other or data item.

The application program 205 may then provide actions that are associated with the recognized string or data. In order to provide actions on the marked up string or data, the application 205 may pass data associated with the recognized string or data to the action DLL 215. The action DLL 215 manages the action plug-ins 225A through 225N that are executed in order to perform the action. The action plug-ins 225A-225N may be packaged with the application program module 205 or may be written by a third party to perform particular actions that are of interest. The action plug-ins 225A-225N provide possible actions to be presented to the user based on the type of word or data passed to the application plug-ins 225A-225N. For example, if data associated with a name is passed to the action DLL 215, an action plug-in 225A that may be responsible for providing electronic mail actions on recognized names may return a list of actions to the application program 205 such as "send e-mail", "add-to e-mail addresses", etc.

The recognizer DLL 210 handles the distribution of text strings and data from an electronic document being edited by the application program 205 to the individual recognizer plug-ins 220A-220N. The recognizer plug-ins 220A-220N recognize particular strings in an electronic document, such as a word processing document or a spreadsheet document. The recognizer plug-ins 220A-220N may be packaged with the application program module 205 or they may be written by third parties to recognize particular strings of interest. Typically, the recognizer DLL 210 passes strings to the recognizer plug-ins 220A-220N in single sentences, paragraphs or cell value increments. However, strings may be passed to the recognizer plug-ins 220A-220N in other sizes and formats.

According to embodiments of the invention, text or data marked up with markup language data may be passed to one or more recognizer DLLs for leveraging the markup language data to recognize and label text or data not marked up with markup language data so that helpful actions may be applied to the recognized text or data. The recognizer DLL 210 in conjunction with a word breaker application breaks the text or data into discrete words and passes the discrete words to one or more recognizer plug-ins 220A-220N for recognition according to each of the individual recognizer plug-ins. Each plug-in may be programmed to recognize a certain category of text or data. For example the recognizer plug-in 220A may be programmed to recognize names, the plug-in 220B may be programmed to recognize addresses, the plug-in 220C may be recognized stock symbols, and so on. For example, if the recognizer plug-in 220A is programmed to recognize names, the plug-in 220A may compare each word received from the recognizer DLL to a database of names such as a user contacts list or telephone directory. A stock symbol recognizer plug-in may compare words passed to it against the database of stock symbols. An address recognizer plug-in may likewise compare text or data against the database of addresses.

A recognizer plug-in may also use more complex logic to recognize and label text or data. For example, an address plug-in may recognize a two-letter state designator as a state, and then the recognizer plug-in may use that recognized text to assist the plug-in in determining that a word immediately preceding the state designator is a city. Likewise, a five-digit number immediately following a state designator may be more readily recognized as a zip code because of its position relative to the state designator.

According to an embodiment of the present invention, information associated with text or data may be passed with the text or data to the recognizer DLL and onto applicable recognizer plug-ins. As will be described in greater detail below, if the text or data is marked up with markup language data, such as Extensible Markup Language, for example, the markup language data associated with a given text string or data may be passed to the recognizer plug-in to assist the plug-ins in labeling text or data. According to another aspect of the invention, text or data may be passed through a given recognizer plug-in iteratively and a given plug-in may utilize text or data recognized from a previous iteration to assist in further recognition during a subsequent iteration.

Figure 3:
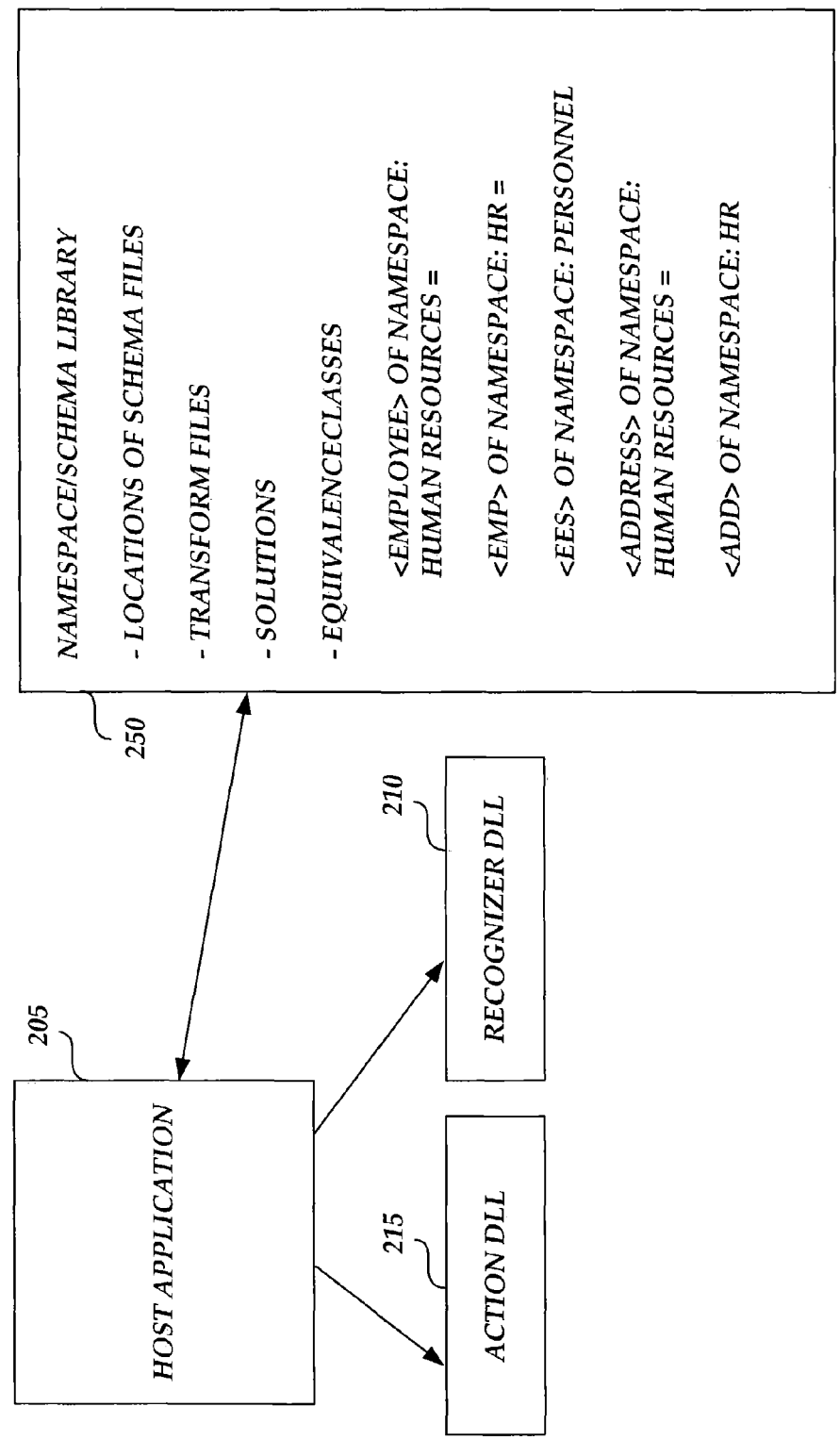
FIG. 3 illustrates a simplified block diagram showing interaction between a host application, a recognizer DLL, an action DLL, and a namespace/schema library for recognizing, labeling, and performing actions on recognized text and/or data according to embodiments of the present invention.

Referring now to FIG. 3, according to an embodiment of the present invention, a set of equivalence classes may be constructed for one or more semantic labels so that actions provided on a given semantic label may also be provided for an equivalent semantic label. For example, the markup data <name> may be designated as an equivalent to the markup data <personname> and actions constructed for <name> may be mapped to <personname>. Accordingly, if the application 205 passes text marked up with the data <name> to the action DLL, actions constructed for the data <name> and <personname> may be returned by the action DLL for use by the application 205. According to an embodiment of the invention, equivalent actions are obtained from an XML namespace (or schema) library 250. If an equivalent XML namespace and data type are located, any actions associated with the given markup data according to the second XML data type and second XML namespace may be combined with or otherwise used by the application 205 to enhance the actions associated with recognized and labeled text string according to the first XML namespace and first XML data type.

It will be appreciated that the namespace/schema library 250 may be integrated with the host application 205, may be remote from the host application 205 at the users computer for, or may be located remotely from the user computer for accessible by the host application 205 via a distributed computing environment. For further detail on the namespace/schema library 250, see U.S. patent application entitled: "System and Method for Providing Namespace Related Information," Ser. No.: 10/184,190, filed Jun. 27, 2002, and assigned to the same Assignee as the present application and which is incorporated herein by reference as if fully set out herein.

Referring still to FIG. 3, if a given text string, for example "John Doe," is labeled as a name, as described above, but is also marked-up within the electronic document with XML data such that the words "John Doe" are tagged with an XML tag of <employee> according the XML namespace "human resources", that information may be passed to the action DLL 215 and action plug-ins to assist in determining available actions for the recognized text string. When the application 205 references the namespace/schema library 250, a determination is made that the XML tag <employee> of the namespace "human resources" is equivalent to the XML tag <emp> of the namespace "HR" and is equivalent to the XML tag <EES> of the namespace "personnel." For example, one document drafter may have marked-up employee information according to the namespace "human resources", another document drafter may have marked-up a document according to the namespace "HR", and yet another document drafter may have marked-up a document according to the namespace "personnel." According to an embodiment of the invention, the application 205 queries the schema library 250 and resolves mappings between equivalent XML namespaces and data. Once the application has resolved the mappings (meaning it has decided which elements can be treated like other elements) it will then call the action DLL and behave as if the original XML element is actually the element that the to which the action pertains. The action DLL does not need to be aware that the markup data mapping has occurred. For example, if the document being edited by a user has been marked up with XML data according the namespace "human resources", this embodiment of the present invention may allow actions associated with a separate document marked up according to the namespace "hr" to be applied to the first document to enhance the set of actions applicable to a given text string or data, for example the name "John Doe." Operation of this embodiment will be described in further detail below with reference to FIGS. 7 and 8.

After an action has been chosen from the list of actions, the action DLL 215 manages the appropriate action plug-in 225A-225N and passes the necessary information between the action plug-in and the application program module 205 so that the action plug-in may execute the desired action. Typically, the application program module 205 sends the action DLL 215 an automation request to invoke the action the user has selected.

FIGS. 4, 5, 6 and 7 illustrate computer screen displays showing illustrative text strings and applicable actions for application to recognized text strings and showing illustrative XML markup of given text strings. As shown in FIG. 4, an employee payroll document, for example, is being edited by a user. The document includes an employee name, "Joe Smith," and includes other employee payroll data. According to embodiments to the present invention, the words "Joe Smith" are passed to the recognizer DLL 210 and to applicable recognizer plug-ins 220A-220N for recognition and labeling. Because the words "Joe Smith" are returned by the recognizer DLL 210 to the application program 205 as recognized text or data, those words are annotated, for example with underlining, as shown in FIG. 4. Once data associated with the recognized text or data is passed to the action DLL 215 and the applicable action plug-in 225A-225N, actions such as "send mail", "add to contacts", "get employee ID" are returned by the action DLL 215 for use in association with the labeled text or data. According to an embodiment of the present invention, selection of one of the actions applied to the recognized text string or data may launch other required software applications, for example electronic mail applications, electronic contacts applications, and the like to provide the functionality associated with the list of provided actions.

According to an embodiment of the present invention, and as described above with reference to FIG. 3, the employee payroll document illustrated in FIG. 4 is marked-up with XML data according to a first XML namespace or schema, and the actions provided on the recognized name may be particular to the given XML namespace or schema. On the other hand, the example Employee Payroll document illustrated in FIG. 5 may have been created by a second document drafter, for example a document drafter at a separate employee's company, and the second payroll document may have been marked-up according to a different XML namespace or schema. Additionally, a separate set of actions may have been created by the second document drafter to be provided for recognized employee names, as illustrated in FIG. 5.

According to embodiments of the present invention, if a text string, such as "Joe Smith," is recognized as an employee name, XML data associated with the employee name is passed to the action DLL and applicable action plug-ins, as described above with reference to FIG. 3. When the action DLL 215 parses the namespace/schema library 250 to determine whether the XML data applied to the recognized string, for example "Joe Smith" has been established as an equivalent to an employee tag according to a second XML namespace, it may be determined that the XML data for the recognized text string is equivalent to XML data associated with a recognized employee name of the second document illustrated in FIG. 5. Accordingly, the action DLL 215 may utilize these equivalent classes to obtain actions applicable to text strings or data marked-up according to the second namespace/schema, as illustrated in FIG. 5, in order to provide an enhanced list of actions by combining actions applicable to both sets of XML namespaces for use with the recognized text string or data in the first document. As shown in FIG. 6, an enhanced set of actions that includes the actions available to a recognized employee name from both documents are now made available to the recognized name in the first document.

Referring to FIG. 7, illustrative XML markup data is illustrated as annotated to a text selection, for example, a name and address. As shown in the example text selection illustrated in FIG. 7, the name, street, and city have been marked up with XML data, but the state and zip code have not been marked-up with XML data. As briefly described above, when text or data is passed from a given document to the recognizer DLL 210 for recognition and labeling, the recognizer 210 and the associated recognizer plug-ins may utilize markup language data such as the XML data illustrated in FIG. 7 to assist the recognizer DLL 210 and the associated recognizer plug-ins in recognizing and labeling given text strings or data. For example, the inclusion the XML tag <pname> around the words "Joe Smith" may be utilized by the recognizer DLL and the associated recognizer plug-ins to recognized the words "Joe Smith" as a name. Likewise, the annotation of the words "Oklahoma City" with the XML tag <city> may be utilized to assist in the recognition of the words "Oklahoma City" as a city. As should be understood, the text and/or data and XML markup illustrated in FIGS. 4, 5, 6, and 7 is for purposes of example only and is not restrictive of the invention as claimed herein.

According to embodiments of the present invention, a given text selection may be processed by the recognizer DLL 210 and the associated recognizer plug-ins 220A-220N to assist in additional recognition and labeling of given text strings or data. For example, if on a first pass to the recognizer DLL 210 and associated recognizer plug-ins, the name, street, and city of the illustrative text shown in FIG. 7 are recognized and labeled, but the string "OK 45678" is not recognized, that text selection may be passed in a second iteration back to the recognizer DLL 210 and associated recognizer plug-ins for a second attempt at recognizing the text strings not recognized during the first pass. During the second pass, the recognizer DLL 210 and associated plug-ins may now leverage the fact that the text string OK is positioned immediately adjacent to the text string "Oklahoma City" that has been labeled as a city in the previous iteration. Accordingly, the recognizer DLL 210 and associated recognizer plug-ins may now determine that there is a high probability that the text string "OK" is a state designator given the two character size of the text string and given its location immediately adjacent to a recognized city.

Likewise, the five-digit number located immediately adjacent to a now recognized state designator may allow the recognizer DLL 210 and the associated plug-ins to label those digits as a zip code either during this iteration through the DLL 210 and associated plug-ins or through a subsequent iteration through the recognizer DLL and associated recognizer plug-ins. According to an embodiment of the present invention, once no additional recognizing or labeling is achieved, the iterative process ends and information associated with the recognized and labeled text strings or data may be passed to the application program 205 for applicable actions, as described above.

Figure 8:
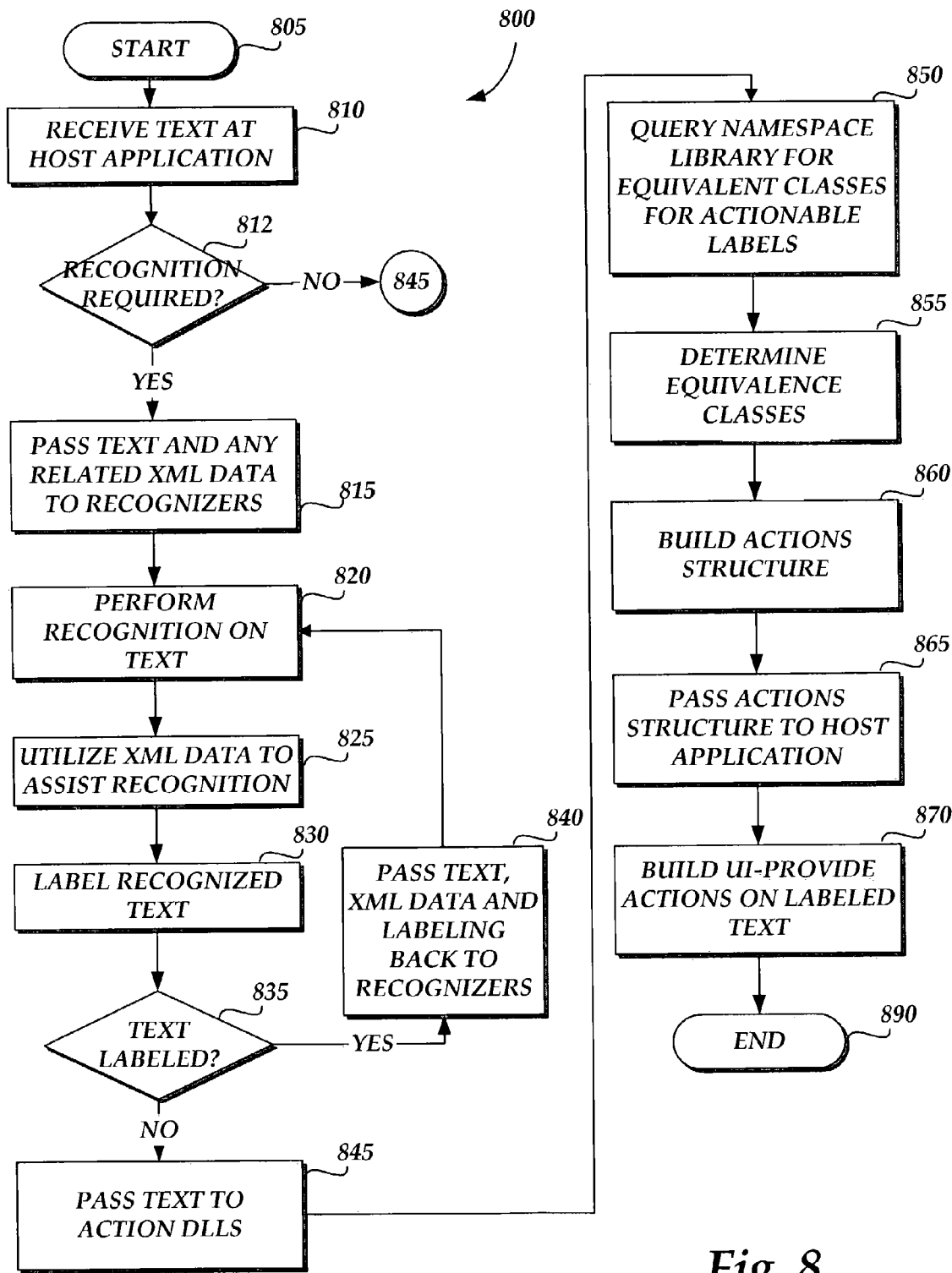
FIG. 8 is a flow diagram illustrating steps performed by a method and system of the present invention for leveraging markup language data applied to text or data for recognizing and labeling text strings or data and for providing helpful actions on recognized text strings or data.

FIG. 8 is a flow diagram illustrating steps performed by a method and system of the present invention for leveraging markup language data applied to text or data for recognizing and labeling text strings or data and for providing helpful actions on recognized text strings or data. The method 800 begins at start step 805 and proceeds to step 810 where a text selection is received at the application program 205. It will be appreciated that the application program 205 may be a word processor application, a spreadsheet application, a text editor, a web browser, or other applications capable of receiving text or data entry. At step 812, a determination is made as to whether text or data of the text selection requires recognition and labeling before helpful actions may be applied. If no additional recognition and labeling are required, the method proceeds to step 845, discussed below. For example, if a text selection contains address data where a street and city are annotated with XML markup data, but where text or data representing a state and zip code are not annotated with markup data, the text selection may be passed to a recognizer DLL, as described above, to utilize the annotation of the street and city to assist the recognizer DLL in labeling the state and zip code so that actions associated with states and zip codes may be made available to the application 205. If such additional recognition and labeling are required, then at step 815, the text selection such as a sentence or paragraph and any related XML data applied to the text selection, as described above with reference to FIG. 7, is passed to the recognizer DLL 210 and associated recognizer plug-ins 220A-220N.

At step 820, the recognizer plug-ins 220A-220N perform recognition on the text string passed from the application program 205. For example, if the recognizer plug-in 220A is responsible for recognizing and labeling names, words of the text selection passed to the recognizer plug-in 220A may be compared against a list of known names such as the user's contact list or telephone directory. At step 825, the recognizer DLL 210 and associated recognizer plug-ins utilize any XML data associated with the text string to assist in recognition. For example, referring back to FIG. 7, if the text string "Joe Smith" is passed to the recognizer DLL 210 and associated recognizer plug-ins, the associated XML tag <pname> is also passed to the recognizer DLL 210 and associated recognizer plug-ins to assist in recognizing and labeling the text selection. For another example, if a city is annotated with an XML tag such as <city>, that information may be used by the recognizer DLL and/or associated plug-ins to determine that an adjacently located two-character string is a state.

At step 830, any text strings or data recognized on a first iteration through the recognizer DLL 210 and associated recognizer plug-ins are recognized and labeled accordingly. At step 835, a determination is made as to whether any text strings or data have been recognized in the first iteration through the recognizer DLL 210 and associated recognizer plug-ins. If so, the method proceeds to step 840, and the text or data and associated XML data and labeling information from the last iteration through the recognizer DLL 210 and associated recognizer plug-ins is passed through the recognizer DLL 210 and associated recognizer plug-ins on a second iteration for more recognition. As described above with reference to FIG. 7, on the second iteration through the recognizer DLL 210 and associated recognizer plug-ins, any recognition information obtained on the previous pass through the recognizer DLL and associated recognizer plug-ins is passed to the recognizer DLL and associated plug-ins on the subsequent iteration to further assist in recognition of a given text string or data. For example, as described above with reference to FIG. 7, if the words "Oklahoma City" are recognized as a city on the first pass through the recognizer DLL and associated recognizer plug-ins, that information may be utilized by the recognizer DLL and associated recognizer plug-ins on the second iterative pass to assist in determining that the text string "OK" is a state designator given the two-character size of the text string and given its proximity immediately adjacent to a recognized and labeled city. On a second pass, recognition and labeling of the text string "OK" in association with other recognized and labeled text or data in the text selection may be utilized by the recognizer DLL and associated recognizer plug-ins to assist in the recognition of the five-digit string "45678" as a zip code.

If no additional recognition and labeling are required, or after additional recognition and labeling of text strings or data is performed, as described with reference to steps 815-840, the method proceeds to step 845, and the text strings and/or data are passed to the action DLL 215 and associated action plug-ins via the application program 205. According to embodiments of the present invention, any markup language data, for example XML data, applied to the recognized text strings and/or data is passed to the action DLL and associated action plug-ins along with the recognized text strings and/or data to allow the action DLL and/or associated plug-ins to return helpful actions associated with the markup language data or labeled portions of the text or data.

At step 850, the application 205 queries the namespace/schema library 250 for equivalence classes for actionable markup language elements and text or data labels. As should be understood the namespace library 250 may be integrated with the application 205, located in memory separate from the application 205 or located in a remote storage location.

As described above with referenced to FIGS. 3-7, if a given text string, for example "Joe Smith," illustrated in FIG. 4, is annotated with an XML tag <employee> according to the namespace "human resources," that information may be utilized to determine that the XML tag <employee> of the namespace "human resources," has been established as an equivalent to the class of recognized names annotated with the XML tag <emp> of the namespace "hr." At step 855, if all equivalence classes have been determined, the method proceeds to step 860, and the action DLL and associated action plug-ins build an actions structure for use by the application 205 in providing helpful actions in association with the recognized text string or data. Alternatively, the action DLL 215 and applicable action plug-ins 225A-225N may determine the first set of actions applicable to the recognized text string or data followed by a determination of whether equivalent actions are available. Once all actions for the recognized and or marked up text string or data including actions of equivalent XML namespaces and data types are determined, the set of available actions is passed to the host application 205. At step 870, the host application 205 builds a user interface, as illustrated in FIG. 6, to provide actions on the labeled text or data. The method ends at step 890.

In summary, according to embodiments of the present invention, markup language data, such as Extensible Markup Language data applied to text strings and/or data items may be utilized for providing helpful actions on marked up text or data. Markup language data applied to text or data may also be utilized to assist in the recognition and semantic labeling of a given text string and/or data item. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A computer-readable medium which stores a set of instructions which when executed performs a method for at least one of creating, editing and viewing an electronic document, actions on a string of text or data in the electronic document, the method comprising:

receiving a text string that includes at least one annotated portion and at least one unannotated portion with markup language data in a recognizer dynamic link library (DLL);

parsing markup language data associated with the at least one annotated portion to assist the recognizer DLL TO DETERMINE AT LEAST ONE LABEL for the at least one unannotated portion of the text string by:

comparing the elements of the markup language data with a plurality of stored markup language elements associated with stored labels to determine a match; and if a one or more markup language elements matches one or more stored markup language elements associated with stored labels, then labeling the text string with the associated stored label of the matched one or more markup language elements;

transmitting the text string, and the markup language data, and the one or more labels associated with at the least one annotated and the at least one unannotated portions to a plurality of action plug-ins, wherein the action plug-ins are determined based on the at least one label;

determining, in the action plug-ins, at least one action based on the markup language data and the at least one label;

passing the at least one action to an application program module for displaying the at least one action in association with the text string; and displaying the at least one action in association with the text string.

2. The method of claim 1, wherein determining, in the action plug-ins, at least one action based on the markup language data comprises:

for each markup language element of the markup language data, parsing a namespace library for equivalent markup language elements that include the at least one label;

obtaining at least one action associated with the equivalent markup language elements for displaying with the plurality of actions received from the plurality of action plug-ins.

3. The method of claim 1, wherein parsing the markup language data to determine at least one label comprises:

comparing the text string with a plurality of stored text string with an associated stored label to determine a match; and if a the text string matches a stored text string with an associated label, then labeling the text string with the associated stored label of the matched stored text string.

comparing the elements of the markup language data associated with the text string with a plurality of stored markup language elements associated with associated stored labels to determine a match; and if a one or more markup language elements associated with the text string matches one or more stored markup language elements with associated stored labels, then labeling the text string with the associated stored label of the matched one or more markup language elements.

4. The method of claim 1, further comprising modifying the content of an electronic document to reflect the at least one label.

5. The method of claim 4, further comprising:

causing the application program module to fire an event within an object model of the application program module;

causing software instructions associated with the event to be executed when the at least one label is determined.

6. The method of claim 1, further comprising examining the content of the electronic document surrounding the text string to aid in parsing the text string to determine a plurality of labels.

7. A method for labeling a string of text in an electronic document as the electronic document is created in an application program module, the method comprising:

as a string of text having an associated at least one Extensible Markup Language (XML) element is entered into the electronic document, determining whether the string of text matches one of a plurality of stored strings;

if so, then designating a label associated with the matched stored string for application to the entered string of text, wherein the label is to be transmitted to at least one action plug-in for determining a set of actions associated with the string of text, and wherein the action plug-ins to receive the label are also determined based on the label;

if the string of text does not match one of a plurality of stored strings, determining whether the at least one XML element associated with the string of text is associated with a label for use with the entered string of text utilizing at least one label associated with another string in the electronic document;

if so, then designating a label associated with the at least one XML element for application to the entered string of text; and displaying an indication indicating that the label has been found for the string of text.

8. The method of claim 7, further comprising:

if a label associated with the matched stored string is designated for application to the entered string of text, determining the set of actions associated with the label associated with the matched stored string; and if a label associated with the at least one XML element is designated for application to the entered string of text, determining the set of actions associated with the label associated with the one or more XML elements.

9. The method of claim 8, whereby determining a set of actions associated with the label associated with the at least one XML element, further comprises:

for each label associated with the at least one XML element, parsing a namespace library for equivalent markup language elements;

obtaining zero or more actions associated with the equivalent XML elements for combining with the set of actions associated with the label associated with the matched stored string.

10. The method of claim 9, further comprising:

determining that a user has selected the string of text; and in response, displaying the combined set of actions to the user.

11. The method of claim 10, further comprising:

receiving an indication that one of the plurality of actions has been selected; and in response to receiving an indication that one of the plurality of actions has been selected, then causing the application program module to execute the selected action.

12. The method recited in claim 11, wherein the application program module executes the selected action by determining whether an action plug-in among the at least one action plug-in in an action dynamically linked library assigned to the action is available; and if so, then receiving instructions from the action dynamically linked library assigned to the selected action.

13. The method recited in claim 12, further comprising:

if an action plug-in dynamic link library is not available, then using a Uniform Resource Locator assigned to the action to navigate to a Web site and download the action plug-in dynamic link library.

14. The method of claim 7, further comprising:

determining whether the at least one XML element associated with the string of text is associated with a label for use with the entered string of text based on a label associated with another string of text adjacent to the string of text.

15. The method of claim 14, wherein the label associated with the string of text is an "address"label and the label associated with the other string of text is a "ZIP code"label.

16. A system for providing helpful actions on a string of text in an electronic document as the string is entered into the electronic document, the system comprising:

a memory storage; and a processing unit coupled to the memory storage, wherein the processing unit is configured to execute:

an application program module for creating the electronic document;

an action dynamically linked library connected to the application program module operative to provide one or more actions associated with at least one markup language element applied to the string of text;

a namespace library associated with the application program module for providing at least one equivalent markup language element that has been designated as equivalent to the one at least one markup language element applied to the string of text in the electronic document;

at least one recognizer dynamically linked library for providing semantic labeling to at least one portion of the string of text based on the at least one markup language element applied to the string of text and based on at least one markup language element associated with other strings of text in the electronic document, wherein the at least one recognizer dynamically linked library is operative to:

receive the string of text, receive the at least one markup language element applied to the string of text in the recognizer dynamically linked library, to transmit the string of text and associated markup language elements to a plurality of recognizer plug-ins based on the semantic labels, and wherein the action dynamically linked library is further operative to provide an additional at least one actions action associated with the at least one markup language element.

17. The system of claim 16, wherein the plurality of recognizer plug-ins being operative:

to parse the string of text to determine a plurality of labels;

to parse the associated markup language elements to assist each of the plurality of recognizer plug-ins to determine a plurality of labels for the string of text;

to transmit the plurality of labels to the recognizer dynamically linked library; and the recognizer dynamically linked library being further operative to transmit the plurality of labels and the associated markup language data to the application program module.

18. The system of claim 17, wherein the recognizer dynamically linked library is further operative prior to transmitting the plurality of labels from the recognizer plug-ins to the recognizer dynamically linked library, to transmit the string of text, the associated markup language elements and the plurality of labels back to the plurality of recognizer plug-ins; and the plurality of recognizer plug-ins being further operative to parse the string of text, the associated markup language elements and the plurality of labels to determine a plurality of labels for the string of text not previously determined for the string of text.

* * * * *